United States Patent [19]

Slarve

[11] Patent Number: 4,559,586
[45] Date of Patent: Dec. 17, 1985

[54] SAFETY HELMET

[76] Inventor: Michael Slarve, 11222 Balcom Ave., Granada Hills, Calif. 91344

[21] Appl. No.: 686,433

[22] Filed: Dec. 26, 1984

[51] Int. Cl.[4] .......................... F21V 33/00; F21L 15/14
[52] U.S. Cl. ........................................ 362/106; 362/72; 362/226; 340/134
[58] Field of Search .......................... 362/72, 106, 226; 340/134

[56] References Cited

U.S. PATENT DOCUMENTS

| | | | |
|---|---|---|---|
| 3,309,691 | 3/1967 | Bonanno | 362/106 |
| 3,793,517 | 2/1974 | Carlini | 362/106 |
| 4,195,328 | 3/1980 | Harris, Jr. | 362/72 |

FOREIGN PATENT DOCUMENTS

| | | | |
|---|---|---|---|
| 1401264 | 4/1965 | France | 362/106 |
| 1528813 | 5/1968 | France | 362/106 |
| 2107039 | 4/1983 | United Kingdom | 362/106 |

*Primary Examiner*—Ira S. Lazarus
*Attorney, Agent, or Firm*—Pastoriza, Kelly & Lowry

[57] ABSTRACT

A rider's helmet for a motorcycle or the like having an auxiliary brake lamp secured thereto and connected via a quick detachable electrical connector in parallel with the brake lamp of the motorcycle.

7 Claims, 9 Drawing Figures

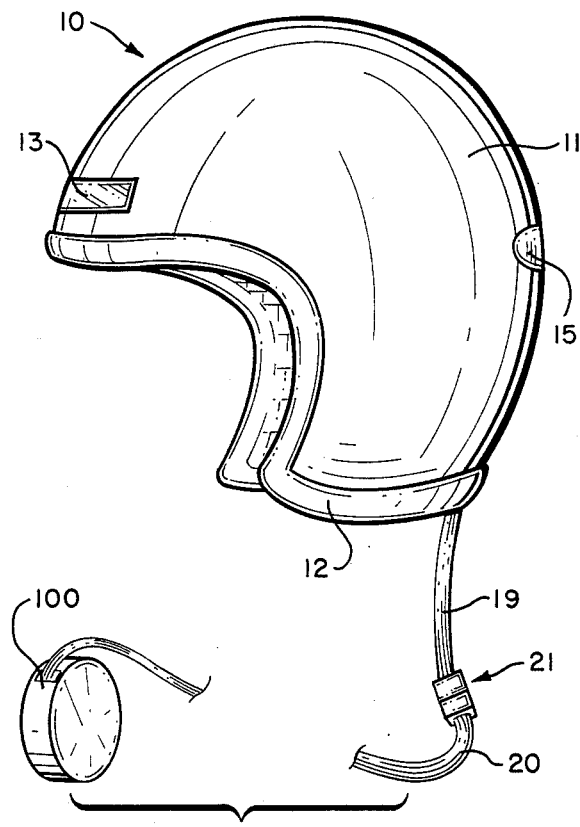
FIG. 1
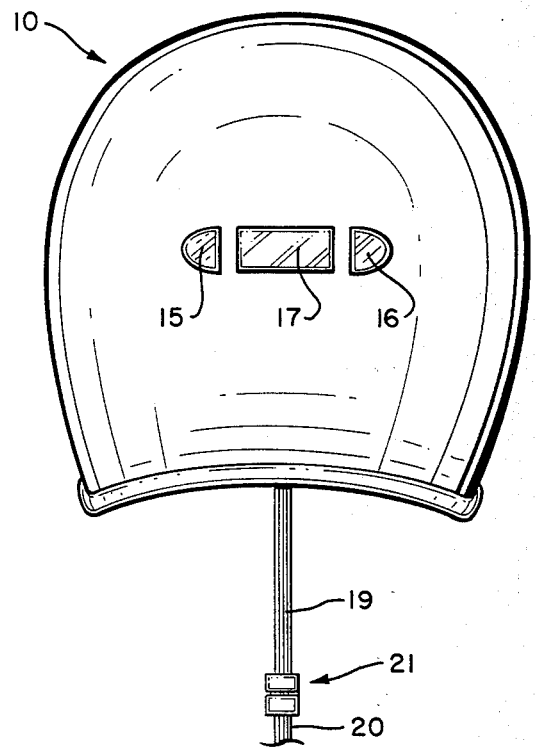
FIG. 2
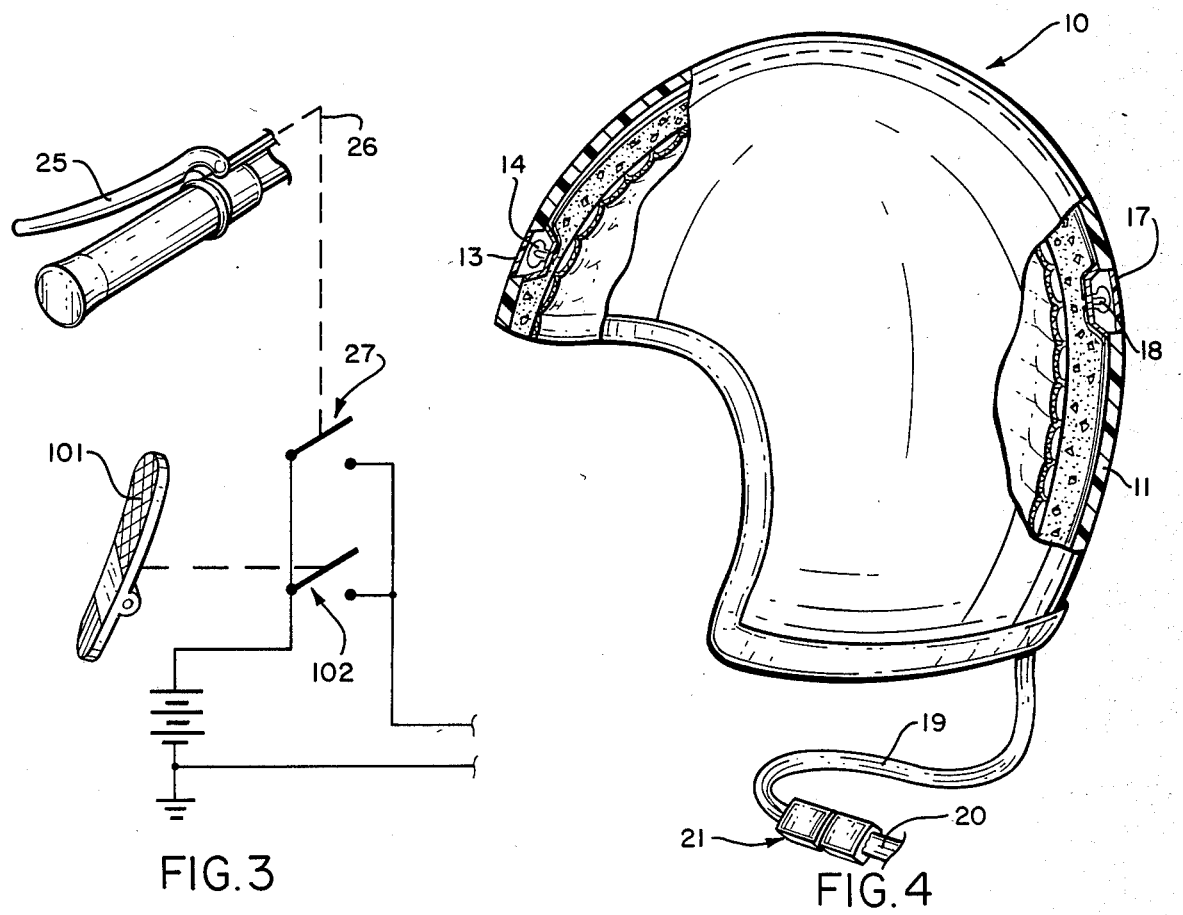
FIG. 3
FIG. 4

SAFETY HELMET

BACKGROUND OF THE INVENTION

This invention relates to headgear for motorcycle riders and more particularly to a helmet mounted auxiliary brake lamp.

PRIOR ART STATEMENT

An illustrated advertisement in the April, 1984, issue of "Better Homes and Gardens" discloses a third brake lamp on an automobile on the forward central portion of the truck lid.

Harris, Jr. U.S. Pat. No. 4,195,328 discloses a morotcycle rider's helmet having a lamp 124 to illuminate a path in front of the rider.

Ippoliti et al., U.S. Pat. No. 4,319,308 discloses a helmet for a motorcycle rider having a lamp 5.

Grosseto, Italian Pat. No. 639,512 discloses a helmet for a motorcyclist. Turn signal lamps are provided on the helmet actuable in response to switches on the handlebars. The specification of this patent describes an intermittent switch to cause the turn signal lamps to flash. This patent also discusses plugging a plug into an inlet or socket.

SUMMARY OF THE INVENTION

In accordance with the device of the present invention the above-described and other disadvantages of the prior art are overcome by providing an auxiliary brake lamp on the rear of the helmet, and a plug and socket connection to place the lamp in parallel with a brake lamp on a motorcycle.

The Grosseto helmet has openings in it for each of 4 lamps. This reduces the structural strength of the helmet. All of the lamps on the helmet of the present invention, except a small front lamp are inside the helmet shell. This retains structural strength.

Grosseto has red and white lamps that work on one circuit illuminating both lamps at the same time in a constant or flashing mode. The present invention calls for two circuits and one connection to the brake lamp. When the brakes are applied, a red lamp in the back of the helmet has its illumination intensity increased. This is the same as that of a normal brake lamp. This shows other drivers the intent to stop.

The present invention involves the use of a white lamp on the front of the helmet. This lamp remains on and its illumination remains constant all of the time. The function of this lamp is mainly to provide illumination when the motorcycle is in need of repair at night. The rider can take off the helmet and direct the white lamp toward the desired area. The same is thus illuminated so that repairs may be made. At the same time the red lamp in back will act as a warning for other motorcyclists or other motorists.

The Grosseto patent has turn arrows that are controlled by independent switches on the handlebars. The brake lamps and turn signals or turn signal lamps of the present invention are connected to the circuit which controls the existing brake lamps and turn signal lamps on the motorcycle.

BRIEF DESCRIPTION OF THE DRAWINGS

In the drawings which are to be regarded as merely illustrative:

FIG. 1 is a perspective view of the helmet for a motorcycle rider constructed in accordance with the present invention;

FIG. 2 is a rear elevation view of the helmet shown in FIG. 1;

FIG. 3 is a diagramatic view of a motorcycle hand brake;

FIG. 4 is a side elevational view, partly in section, of the helmet shown in FIGS. 1 and 2;

DESCRIPTION OF THE PREFERRED EMBODIMENTS

Figure 5:
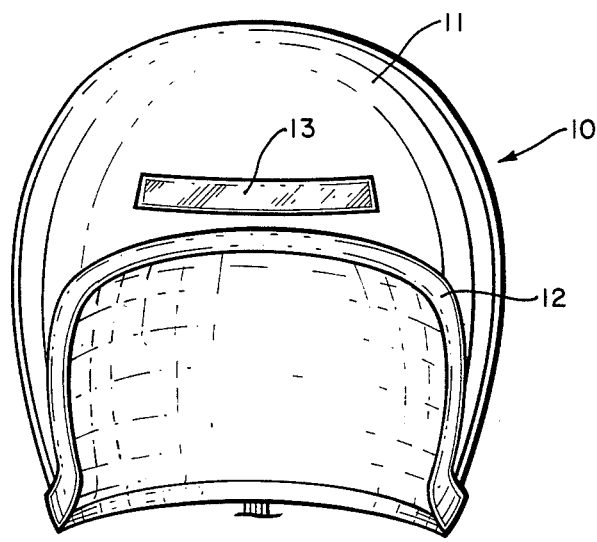
FIG. 5 is a front elevational view of the helmet shown in FIGS. 1, 2, and 4.

The helmet of the present invention is shown at 10 in FIG. 1. Helmet 10 may be conventional except for the inventive differences described herein. Helmet 10 is a hard shell 11 with piping 12. Helmet 10 has a lens 13 to diffuse light from a white lamp 14 (FIG. 4).

The rear of shell 11 in FIG. 2 has left and right turn lenses 15 and 16, respectively, behind which left and right turn lamps (not shown) are located.

A brake lens 17 is provided behind which a brake lamp 18 is positioned as shown in FIG. 4.

All of the helmet lamps including brake lamp 18 are connected to electrical circuits of a motorcycle via groups of wires 19 and 20, the two groups of which are connected by a conventional quick detachable electrical connector 21 (FIGS. 1, 2, and 4).

Figure 9:
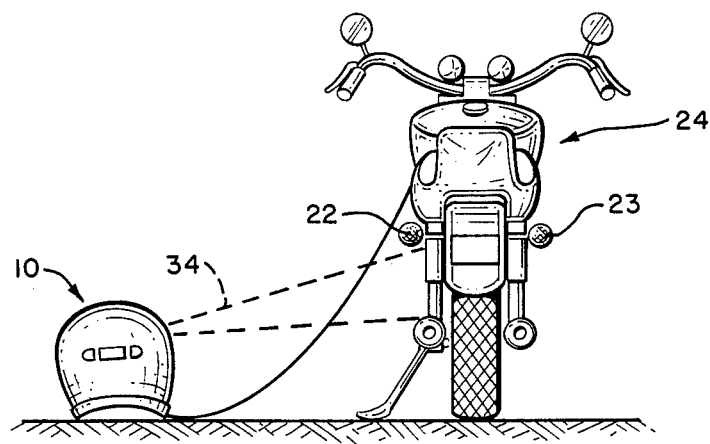
FIG. 9 is a rear elevational view of the motorcycle with the helmet of FIGS. 1, 2, 4, 5, and 8 electrically connected thereto.

Brake lamp 18 is electrically connected in parallel with the brake lamp control or the lamps 22 and 23 on a motorcycle 24 shown in FIG. 9. Lamps 22 and 23 are the brake lamps of motorcycle 24.

Responsive to actuation of a brake handle 25 in FIG. 3, a brake cable 26 closes a switch 27 which energizes lamps 22, 23, and 18 synchronously and intermittently by a conventional intermittent switch (not shown).

Brake pedal 101 in FIG. 3 controls a switch 102 in parallel with switch 27.

Figure 6:
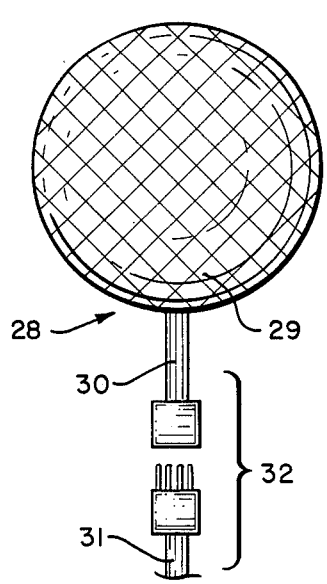
FIG. 6 is a rear elevational view of apparatus for assembly with the helmet of FIGS. 8 and 9.
Figure 7:
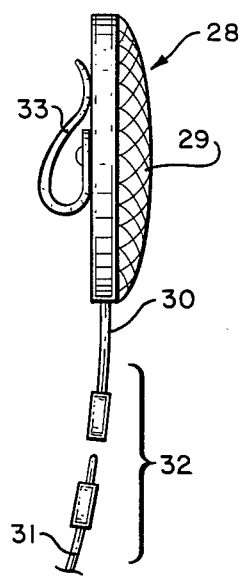
FIG. 7 is a side elevational view of the apparatus shown in FIG. 6.
Figure 8:
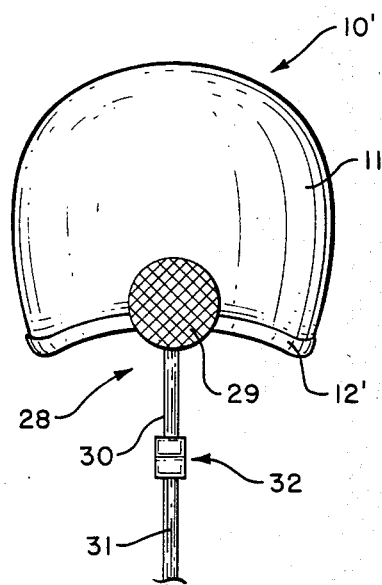
FIG. 8 is a rear elevational view of the helmet with the apparatus of FIGS. 6 and 7 attached thereto.

A conventional helmet 10' with a hard shell 11' and piping 12' is shown in FIG. 8 with which apparatus 28 of FIGS. 6 and 7 may be employed.

In FIGS. 6 and 7, a brake lamp 29 is provided which has wires 30 and 31 connected together by a quick detachable electrical connector 32. Connectors 21 and 32 are both conventional.

Lamp 29 has a spring clip 33 with which it can be clipped to helmet 10' in the position shown in FIG. 8.

Helmet 10 may be placed on the ground as shown in FIG. 9 so that lamp 14 via beam 34 may illuminate motorcycle 24. This can be done if a night repair is needed. In this case lamps 22, 23, and 18 flash simultaneously.

White lamp 14 in the front of helmet 10 is employed for added visibility for the drivers of other vehicles. As shown in FIG. 9, lamp 14 can be used in case of night repairs or in otherwise poorly lit areas.

All lamps are placed between the outer plastic shell 11 and styrofoam padding liner 35 (FIG. 4). Wire to helmet 10 may be of very light gauge with a breakaway connector for safety.

A simple hook-up may be made to the tail lamps of any motorcycle or vehicle requiring a helmet. This hook-up would normally have a long wire leader for convenient connector location.

For connection of the circuits from the vehicle to the helmet there may be a retractable cord. The retractor is shown at 100 in FIG. 1. This retractable cord 100 may have a convenient location on the vehicle.

In the case of a motorcycle, the rider would get astride, put on the helmet, grasp the end of the retractable cord, pull the cord to the proper length for comfort, then mate the connector.

It will be appreciated that the embodiment of the invention shown in FIG. 8 is somewhat different than that of FIGS. 1-5. The embodiment of FIG. 8 can be used by a person who does not own the helmet of FIGS. 1-5, but does own the conventional helmet 10' of FIG. 8.

What is claimed is:

1. In combination with a motor driven bike or the like having brakes, an electrical power supply and a tail lamp, and having means including an electrical switch to increase the illumination provided in or around the tail lamp responsive to the application of the brakes, a rider's helmet comprising:
   a head conforming shell;
   an auxiliary brake lamp fixed relative to the rearward external surface of said shell;
   at least first and second wires connected from said switch to supply power when said brakes are applied;
   third and fourth wires connected to supply power to said auxiliary brake lamp; and
   a quick detachable electrical connector matable for connecting said first and second wires to said third and fourth wires, respectively.

2. The invention as defined in claim 1 wherein:
   retractable means are mounted on said bike, said third and fourth wires being fixed to said retractable means.

3. The invention as defined in claim 2 wherein:
   said auxiliary brake lamp is removably secured to said helmet.

4. The invention as defined in claim 3 wherein:
   said auxiliary brake lamp has a spring clip to fit inside said helmet and to hold said auxiliary brake lamp against the rearward external surface thereof.

5. The invention as defined in claim 1 wherein:
   said auxiliary brake lamp is removably secured to said helmet.

6. The invention as defined in claim 5 wherein:
   said auxiliary brake lamp has a spring clip to fit inside said helmet and to hold said auxiliary brake lamp against the rearward external surface thereof.

7. In combination with a motor driven bike or the like having brakes, an electrical power supply and a tail lamp, and having means including an electrical switch to increase the illumination provided by the tail lamp responsive to the application of the brakes, a rider's helmet comprising:
   a head conforming shell;
   an auxiliary brake lamp fixed relative to the rearward external surface of said shell;
   at least first and second wires connected from said switch to supply power when said brakes are applied; and
   third and fourth wires connected to supply power to said auxiliary brake lamp;
   said first and second wires being connected to said third and fourth wires, respectively.

* * * * *